Patented Oct. 30, 1923.

1,472,331

UNITED STATES PATENT OFFICE.

PAUL HILDEBRANDT, OF HAMBURG, GERMANY, ASSIGNOR, BY MESNE ASSIGNMENTS, TO THE CHEMICAL FOUNDATION, INC., A CORPORATION OF DELAWARE.

PROCESS FOR THE TREATMENT OF ALBUMENOUS ANIMAL WASTE FOR THE PREPARATION OF HUMAN FOOD.

No Drawing. Application filed December 26, 1917. Serial No. 208,864

*To all whom it may concern:*

Be it known that I, PAUL HILDEBRANDT, citizen of the Empire of Germany, residing at Hamburg, Germany, have invented new and useful Improvements in a Process for the Treatment of Albumenous Animal Waste for the Preparation of Human Food (for which I have filed an application in Germany, April 25, 1917), of which the following is a specification.

It is known, that horn, hairs and other animal waste contain considerable quantities of albumenoid matter. Raw materials of this kind have never been commercially made use of for the preparation of human food or of substitutes for meat-extract like preparations because the products obtained have a nauseous taste. That loathsome taste may be due to various causes. My investigations have convinced me that the nauseous taste is chiefly due to free fatty acids, and sometimes to amino-bases as well which possess an unpleasant taste and smell.

The object of the present invention is the preparation of edible food stuffs from the raw material mentioned above by treating horn, hairs, skins, intestines and the like in such a manner that the matter which gives the nauseous taste to the final product is removed from the albumenous solutions obtained by hydrolysis before their final concentration.

My belief that the bad smell of the final product is due to free fatty acids appears to be demonstrated by experiments which I made and which proved that heating the raw materials with dilute alkaline solutions with which the fatty acids form soaps gave the result desired inasmuch as the bad and nauseous taste was quickly removed from the solutions. I have also found that solvents which dissolve the free fatty acids without altering them chemically give a similar good result.

Finally I have found that treatment of the raw material with live steam, preferably under increased pressure has the same good effect. I have also found that such treatment with steam may preferably be combined with the treatment with alkaline solutions or suitable solvents.

The invention therefore consists in treating albumenoid matter contained in animal waste for the preparation of human food products of a pleasant taste and a good smell by allowing steam to act on the raw material whereupon it may be treated either with dilute alkaline solutions or with solvents which extract fatty acids. The same solvents will also remove fats which have undergone a partial decomposition.

What I claim is:—

1. A process for the treatment of horn, hairs, skins, intestines and other albumenous animal waste for the preparation of human food products, consisting in treating the raw material with live steam, thereupon extracting it with solvents which dissolve free fatty acids, and finally hydrolyzing the mass.

2. A process for the treatment of horn, hairs, skins, intestines and other albumenous animal waste for the preparation of soluble albumenous food consisting in treating the raw material with live steam, thereupon treating such material with dilute alkaline solutions, and finally hydrolyzing the mass.

In testimony whereof I have signed my name to this specification in the presence of two subscribing witnesses.

PAUL HILDEBRANDT.

Witnesses:
 EDUARD SIEBRAUR,
 WALTER AHRENS.